United States Patent
Olakangil et al.

(10) Patent No.: US 11,245,624 B2
(45) Date of Patent: Feb. 8, 2022

(54) SYSTEMS AND METHODS FOR IMPLEMENTING MULTI-TABLE OPENFLOW FLOWS THAT HAVE COMBINATIONS OF PACKET EDITS

(71) Applicant: Arista Networks, Inc., Santa Clara, CA (US)

(72) Inventors: Joseph Olakangil, San Jose, CA (US); Nitin Karkhanis, Fremont, CA (US); Anuraag Mittal, Livermore, CA (US); Purushothaman Nandakumaran, Milpitas, CA (US); Manjula Gopalakrishnan, Cupertino, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 16/864,716

(22) Filed: May 1, 2020

(65) Prior Publication Data
US 2021/0344599 A1  Nov. 4, 2021

(51) Int. Cl.
*H04L 12/743* (2013.01)
*H04L 29/06* (2006.01)
*H04L 12/741* (2013.01)
*H04L 12/721* (2013.01)

(52) U.S. Cl.
CPC .......... *H04L 45/7457* (2013.01); *H04L 45/38* (2013.01); *H04L 45/54* (2013.01); *H04L 69/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,778,721 | B1* | 9/2020 | Holbrook | G06F 16/9014 |
| 2014/0016647 | A1* | 1/2014 | Yoshida | H04L 47/10 |
| | | | | 370/395.53 |
| 2015/0281098 | A1* | 10/2015 | Pettit | H04L 45/64 |
| | | | | 370/235 |
| 2016/0337232 | A1* | 11/2016 | Gorja | H04L 45/38 |
| 2018/0167318 | A1* | 6/2018 | Srinivasan | H04L 45/741 |
| 2020/0204485 | A1* | 6/2020 | Singh | H04L 69/22 |
| 2020/0344143 | A1* | 10/2020 | K | H04L 43/062 |

OTHER PUBLICATIONS

OpenFlow Switch Specification Visionl.3.0 (2012) 106 pages.

* cited by examiner

*Primary Examiner* — Xavier S Wong
(74) *Attorney, Agent, or Firm* — Fountainhead Law Group P.C

(57) ABSTRACT

Systems and methods are provided herein for implementing multi-table OpenFlow flows that have combinations of packet edits. This may be accomplished by a network device receiving a first flow entry with a first set of actions to be installed into a flow table. The network device may determine that the first set of actions includes edits to a plurality of fields of a matched data packet. In response, the network device may change the first set of actions of the first flow entry to edit a first field of the data packet and create a second flow entry with a second set of actions to edit a second field of the data packet. The network device may install the first and second flow entries into one or more flow tables of the network device.

20 Claims, 7 Drawing Sheets

SYSTEMS AND METHODS FOR IMPLEMENTING MULTI-TABLE OPENFLOW FLOWS THAT HAVE COMBINATIONS OF PACKET EDITS

BACKGROUND

The present disclosure relates to network device programming, in particular to programming packet processing.

SUMMARY

OpenFlow is a networking protocol and device specification that enables networking controllers to remotely manage and control the forwarding plane of network devices such as switches and routers. Each flow entry can include a set of match fields specifying one or more criteria for matching data packets to the flow entry and a set of actions to be executed on matched packets. Network controllers generate data packet processing rules, known as flow entries, and communicate the generated flow entries to network devices. Upon receiving the generated flow entries from the network controllers, the network devices install the flow entries into one or more flow tables, which are part of the device's OpenFlow packet processing pipeline. These flow tables are usually implemented using ternary content addressable memory (TCAM) banks that are located within the device's packet processor.

One type of packet processor is an application-specific integrated circuit (ASIC), which receives network packets ingressing or egressing a network device. The ASIC processes the ingress/egress packets in accordance with flow entries installed in TCAMs. Some flow entries' set of actions includes a combination of packet edits to be executed on a matched packet. Due to the technical challenges involved, many ASICs are unable to perform a combination of packet edits in a single flow causing them to not easily be integrated into current systems. These types of ASICs are still desirable as they can be cheaper and more readily available than other packet processors. Flow entries, which require actions that cannot be performed by these ASICs, can be identified and modified by the network controller, but doing so increases the load on the network controller. Controllers without this functionality are not able to easily integrate with these types of desired ASICs. Therefore, there exists a need for a system that easily integrates an ASIC, which is unable to perform a combination of packet edits in a single flow, that still results in properly executed actions according to received flow entries.

Accordingly, techniques are disclosed herein for improved systems and methods for implementing multi-table OpenFlow flows that have combinations of packet edits. Various disclosed embodiments provide receiving, by a network device, a flow entry to be installed into one or more flow tables of the network device. The network device determines that the set of actions of the flow entry includes modifications of two or more fields of a data packet, which cannot be performed by the network device with a single flow. For example, the network device may be using an ASIC that is unable to perform a combination of packet edits (e.g., Source IP and Destination Mac) with a single flow. The network device splits the flow entry into two or more other flow entries. A data packet going through the processing pipeline will be edited according to the set of actions of the original flow entry, but the set of actions will be applied using multiple flow entries. Henceforth the original flow, its matches and actions will be referred to as first flow, first matches and first actions.

In one example, the network device receives a flow that has two packet edits. The packet edits cannot be executed by the ASIC with a single flow. The network device changes the first set of actions of the first flow entry and creates a second flow entry. The network device changes the first set of actions to include modifying only the first of the two fields of the matched data packet indicated by the first flow entry. The network device further changes the first set of actions to include generating and attaching a cookie to the matched data packet. For example, a unique flow identifier may be used as the cookie attached to the matched data packet. Finally, the network device changes the first set of actions to include directions to pass the matched data packet to the second flow entry. In one example, the matched data packet is passed by being recirculated through a first flow table. In this case, the first match criteria will be augmented to ensure that this edited packet is not matched by the first flow again. In another example, the matched data packet is passed by being forwarded to a downstream flow table where the second flow entry is installed. The second flow entry, created by the network device, includes a second set of match fields and a second set of actions. The second set of match fields specifies criteria for matching a data packet to the second flow entry, where one of the criteria matches on the generated cookie of the data packet. The second set of actions to be taken on a matched data packet includes removing the cookie from the data packet and modifying the second of the two fields of the packet. The network device installs the first and second flow entries into one or more flow tables stored on the network device.

Various disclosed embodiments provide a network device receiving a data packet. Upon receiving the data packet, the network device uses one or more criteria to match the data packet to a first flow entry. For example, a criterion can be that the data packet has a specific destination IP address. After the data packet has been matched, the network device executes actions according to the first flow entry. The actions can include modifying a first field of the data packet, generating and attaching a cookie to the data packet, and recirculating the data packet. Upon being recirculated, the network device matches the recirculated data packet to a second flow entry using the cookie attached to the recirculated data packet. After the recirculated data packet has been matched, the network device executes actions according to the second flow entry. The actions can include removing the cookie from the recirculated data packet and modifying a second field of the data packet. After executing the actions, the network device transmits the data packet to another flow table or another network device.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
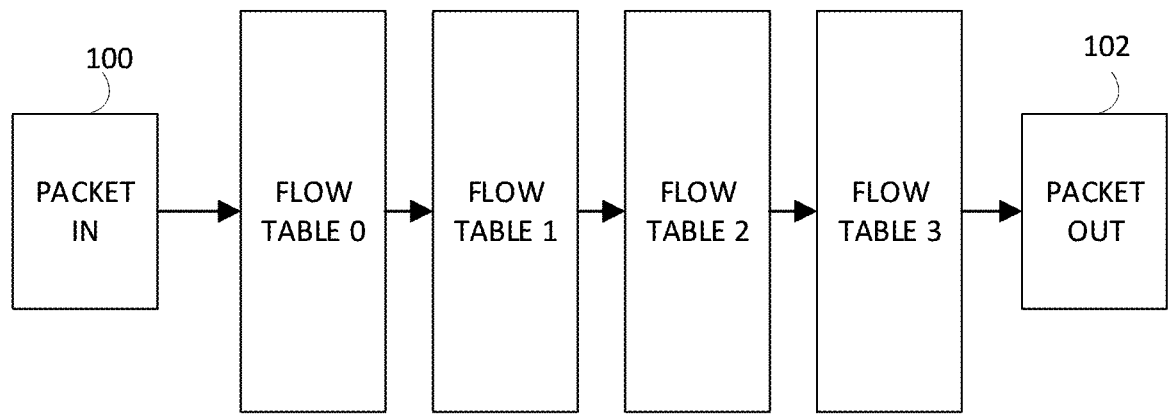
FIGS. 1A and 1B show multi-table OpenFlow processing pipelines, according to some embodiments.

FIG. 1A shows a multi-table OpenFlow processing pipeline according to some embodiments. As shown, an ingress packet 100 is received at the first flow table, flow table 0. The flow table 0 uses match fields to match the data packet to flow entries installed in flow table 0. Match fields include packet headers, ingress ports, metadata values, wildcards (which match any value), bitmasks, or similar such fields in which a data packet can be matched. After the data packet has been matched to a flow entry, the actions associated with the flow entry will be executed on the data packet. These actions can include a "goto table" action, an "edit" action, a "drop" action, an "output" action, or similar such actions. If a packet is matched to a flow entry and the flow entry's actions include a "goto table" action identifying a downstream flow table, the packet is matched against the flow entries of that downstream flow table.

In some embodiments, the "goto table" action can cause a data packet to be recirculated through a flow table. In an embodiment, if a packet is matched to a flow entry and the flow entry's actions do not include a "goto table" action, the pipeline processing is terminated at the current flow table. The network device forwards a matched data packet in accordance with the actions of the matched flow entry. For example, a data packet may be matched at a first flow entry at flow table 0. The actions corresponding to the first flow entry may include both an "edit field" action and a "goto table 2" action. After the field of the data packet has been edited, the network device will forward the data packet to flow table 2 as indicated by the "goto table 2" action. At flow table 2, the data packet will be matched to a flow entry of flow table 2 according to match criteria and have actions executed on the data packet in accordance with the matched flow entry. This packet will continue through the processing pipeline 100 until the packet is finally handled (e.g., dropped or forwarded) and thus exits the pipeline 102.

Figure 1B:
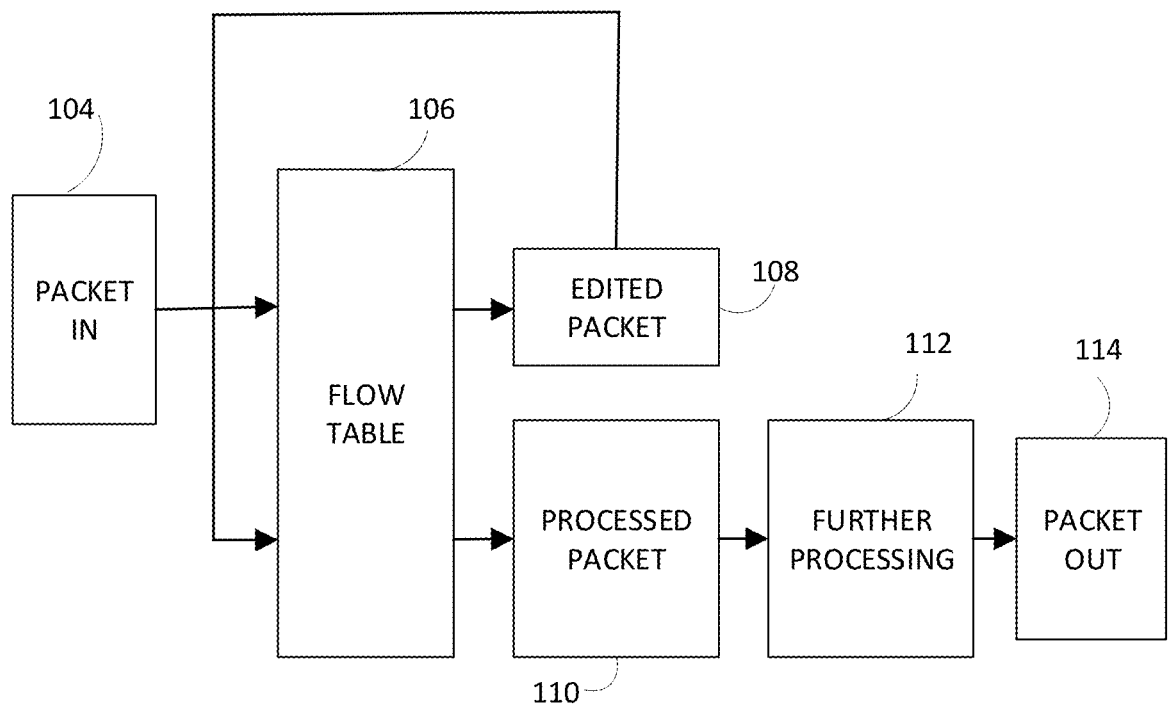

FIG. 1B shows a multi-table OpenFlow processing pipeline according to some embodiments. In this embodiment, an ingress packet 104 is received at a first flow table 106. The first flow table 106 uses match fields to match the data packet to a first flow entry installed in the first flow table 106. The actions corresponding to the first flow entry include an "edit field" action, a "generate cookie" action, and a "recirculate" action. Accordingly, the network device edits the field of the data packet according to the action of the first flow entry. For example, the edit of the field may be changing the source and destination IP address of the data packet. The network device further generates a cookie and attaches the cookie to the data packet. Finally, the edited packet 108 is recirculated as instructed by the first flow entry. In some embodiments, the "recirculate" action may be a "goto table" action where the table is the first flow table 106 where the ingress packet was just matched.

The edited packet 108 is recirculated through the first flow table 106 where it was originally matched with the first flow entry. As the edited packet 108 is recirculated, the first flow table 106 again uses match fields to match the data packet to a corresponding flow entry. A second flow entry of the first flow table 106 has match fields that match on the cookie attached to the edited packet 108. In some embodiments, the actions corresponding to the second flow entry include an "edit field" action, a "remove cookie" action, and a "goto table 2" action. Accordingly, the network device edits the field of the edited data packet 108 according to the actions of the second flow entry. In some embodiments, the "edit field" action of the second flow entry edits a different field or fields than the first flow entry. For example, the edit of the field of the second flow entry may be changing the source and destination Mac address of the edited data packet 108. The network device further removes the cookie from the edited data packet 108. Finally, the network device forwards the processed packet 110 for further processing 122. In this embodiment, the network device forwards the processed packet 110 to flow table 2 in accordance with the "goto table 2" action of the second flow entry. The processed packet 110 may be sent to any downstream flow table for further processing 112. In some embodiments, the processed data packet 110 has further actions taken on it in accordance with flow entries on downstream flow tables. The processed packet 110 will continue through the processing pipeline until the packet is finally handled and thus exits the pipeline 114.

Figure 2:
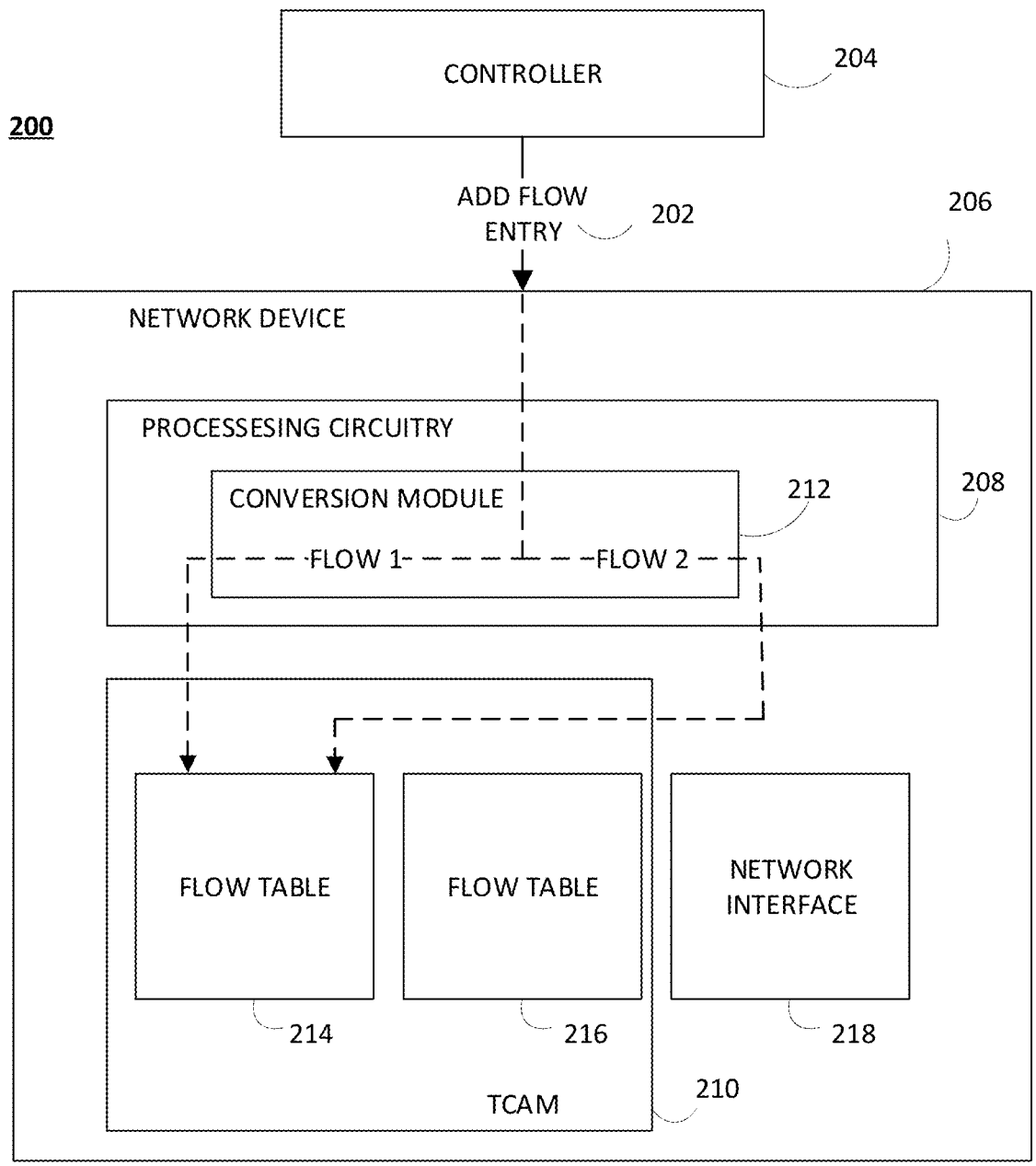
FIG. 2 shows a network device processing a flow entry, according to some embodiments.

FIG. 2 shows a network device 206 processing a flow entry according to some embodiments. The network device 206 is configured to communicate with a network controller 204 and process OpenFlow protocol messages sent by network controller 204. These protocol messages include instructions for controlling the forwarding pane of the network device 206. For example, one type of protocol messages is an "add flow entry" message 202 for adding new flow entries to flow tables (214 and 216) corresponding to the network device 206. Although two flow tables are shown, any number of flow tables may be used. As mentioned above, these flow tables can be implemented using a TCAM 210 other any other hardware resources capable of flow table implementation. The first flow table 214 and second flow table 216 have flow entries installed in their respective flow tables. These flow entries include a set of match fields specifying one or more criteria for matching network packets to the flow entry and a set of actions to be taken on the matched packets. After receiving the "add flow entry" message 202, the network device 206, using processing circuitry 208, installs the flow entries of the "add flow entry" message 202 into TCAM 210. Although one TCAM 210 is shown, any number of TCAMs may be used.

In some embodiments, after receiving the "add flow entry" message 202, the network device 206 determines a first flow entry with a first set of match fields and a first set of actions to be taken on a matched data packet as indicated by the "add flow entry" message 202. The network device 206 then determines if the first set of actions to be taken on the matched data packet includes more than one packet edit. For example, the network device 206 may use an ASIC, which is incapable of performing a combination of packet edits in a single flow. Accordingly, a flow entry with a first set of actions that includes a combination of packet edits cannot be done by the network the device 206. If the set of actions includes more than one packet edit, then the network device 206 sends the first flow entry to a conversion module 212. The conversion module 212 can convert, modify, edit, and/or create flow entries. In some embodiments, every "add flow entry" message 202 is processed by the conversion module 212.

Because the actions of the first flow entry include more than one packet edit, the conversion module 212 creates two separate flows. The conversion module 212 creates or modifies the original first flow entry into a new first flow entry. The new first flow entry may be exactly the same as the original first flow entry except the actions of the first flow entry are modified. The modified actions of the new first flow entry include editing one of the two or more packet edits of the original first flow entry, generating and attaching a cookie, and recirculating the data packet. Additionally, the conversion module 212 creates a second flow entry. The second flow entry includes match fields that match on the cookie attached to the recirculated cookie generated and attached to the data packet by the first flow entry. The second flow entry's set of actions include removing the cookie, editing the second of the two or more packet edits of the original first flow entry, and adding the "goto table" instruction of the original flow entry. In some embodiments, instead of modifying the actions of the new first flow entry to include recirculating the data packet to the same first flow table, the conversion module 212 includes a "goto table" action. The "goto table" action can send the processed packet to a sequential second flow table where the second flow entry is installed.

In embodiments where the original first flow entry includes more than two packet edits, this method can be replicated. For example, instead of the second flow entry adding the "goto table" instruction of the original first flow entry, the second flow entry could generate and attached a second cookie. The conversion module 212 could then create a third flow entry wherein the match fields match on the cookie attached to the data packet from the second flow entry. The third flow entry's set of actions can include removing the cookie, editing a third packet edit of the original first flow entry, and a "goto table" action of the original first flow entry.

The network device 206 then sends the two flow entries to the TCAM 210 to be installed into a first flow table 214. Once the flow entries are installed into the first flow table 214, they can be used to match against ingress network packets in accordance with the OpenFlow pipeline. If a match between a particular flow entry and a particular packet is found, the flow entry's actions are executed on that packet. In one set of embodiments, the action for adding and setting the match-table metadata field on the matched packet can involve invoking a proprietary packet encapsulation protocol supported by processing circuitry 208, such as Broadcom's HiGig/HiGig 2 protocol. In other embodiments, this action can involve re-purposing an existing packet header field of the matched packet as the match-table metadata field, and thus adding the match-table metadata field value to that existing packet header field.

Figure 3:
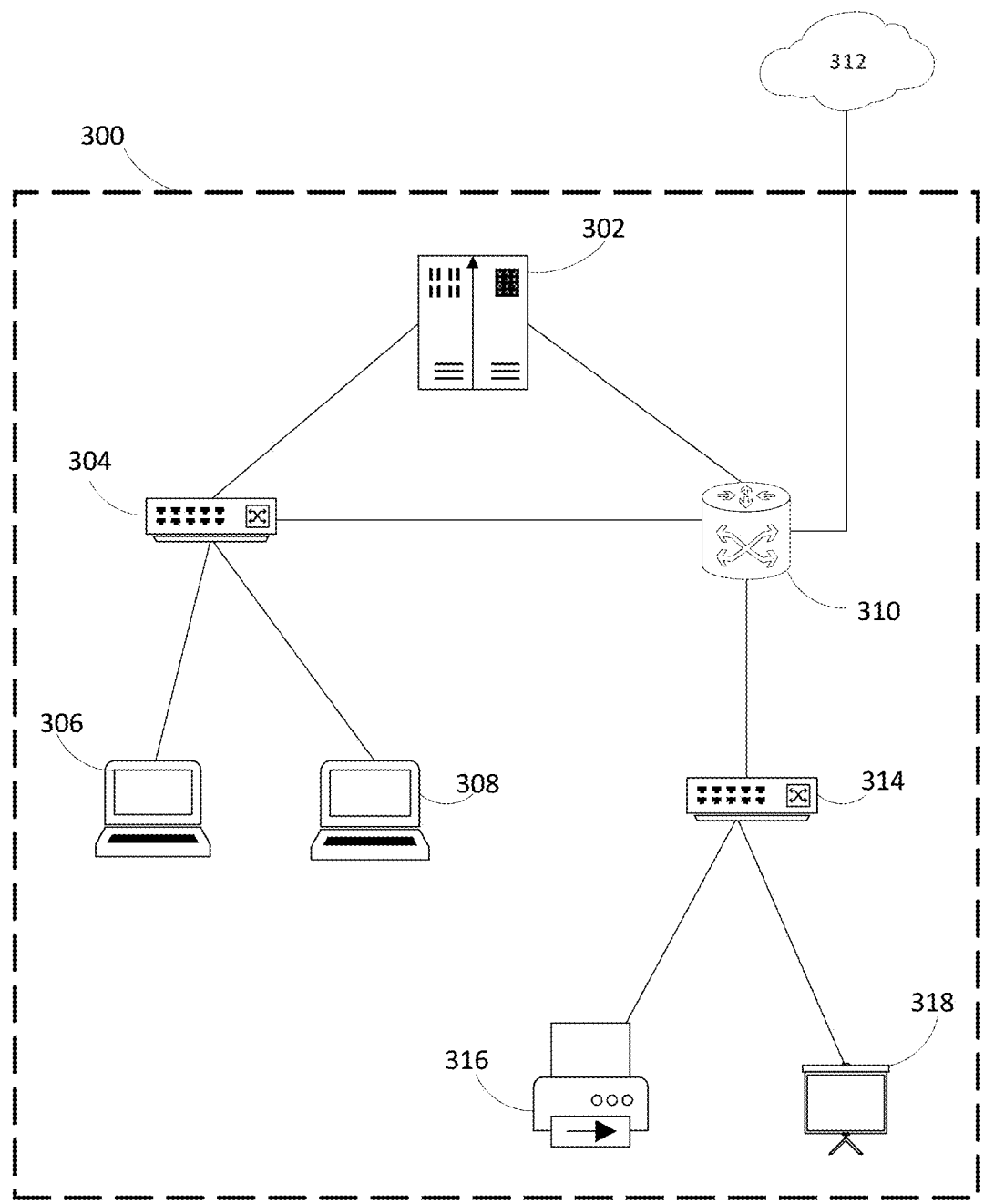
FIG. 3 is a block diagram of an illustrative network topology, according to some embodiments.

FIG. 3 is a block diagram of an illustrative network topology according to some embodiments. A network router 310 connects a local area network (LAN) 300 to the internet 312 while network devices 304 and 314 internal to LAN 300 route network traffic to or from particular LAN devices/destinations 306, 308, 316, and 318. In some embodiments, based upon the analysis of packets, a network controller 302 may send commands using a networking protocol, such as OpenFlow, to the devices 304 and 314 and/or router 310 to update their processing of particular packets. In an example, a controller 302 sends an "add flow" message to network device 304, wherein the flow entry to be added has a combination of packet edits. The network device 304 then converts the flow entry into two flow entries in accordance with the techniques described herein.

In some embodiments, a network test access point (TAP) and/or switched port analyzer (SPAN) may be utilized to collect network traffic for analysis. The TAP or SPAN device may forward a copy of collected packets to a device (e.g., a network server and/or controller) used for the analysis. Based on the analysis, programming of the various network elements utilizing TCAMs can be performed such as described.

Figure 4:
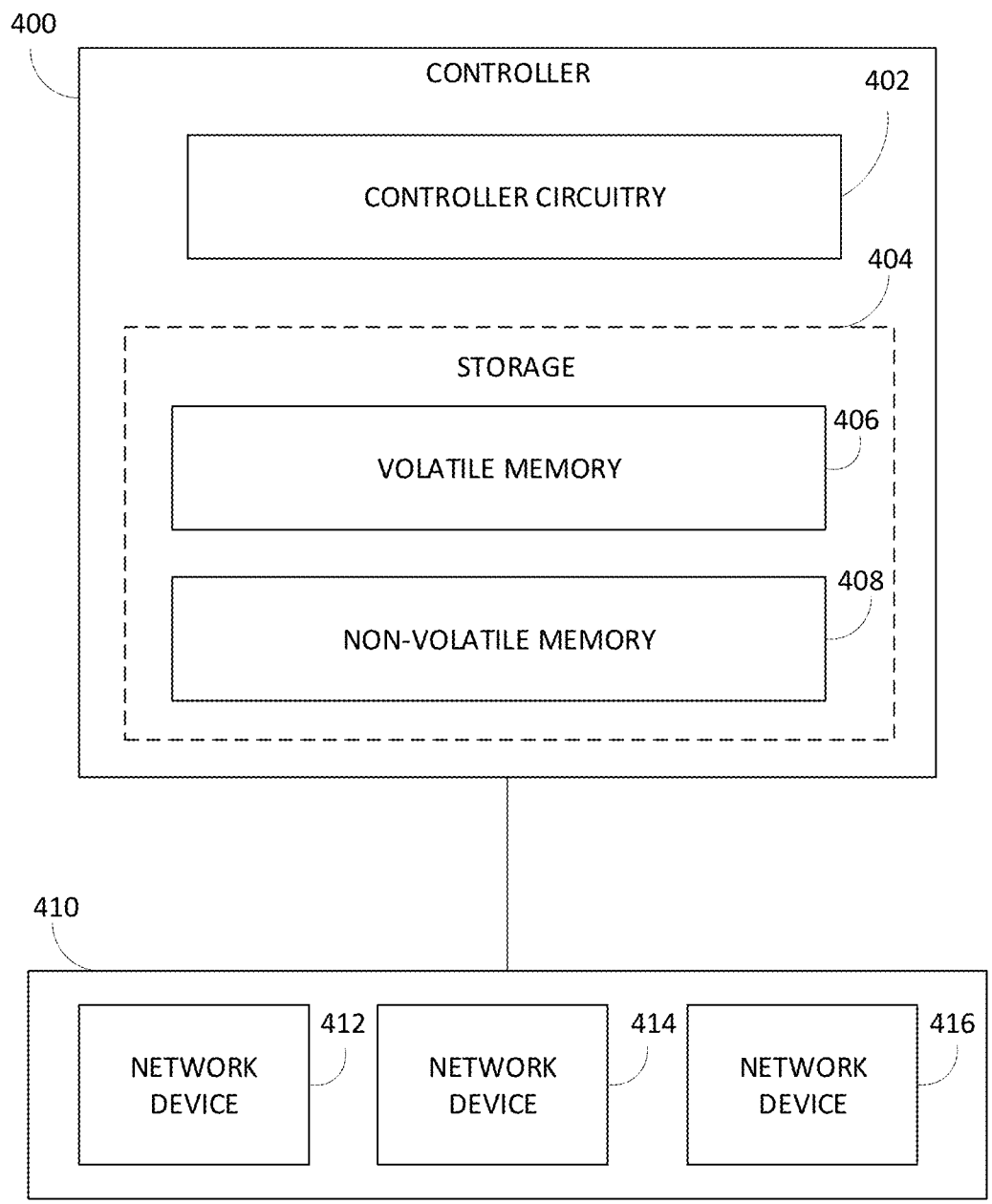
FIG. 4 shows a diagram of a network controller for configuring a network, according to some embodiments.

FIG. 4 shows a diagram of a network controller 400 for configuring a network according to some embodiments. A network includes a group 410 of devices 412, 414, and 416, which that are connected to a network controller 400. A network controller 400 receives network data, which may be stored in storage 404 in either volatile memory 406 or non-volatile memory 408. Control circuitry 402 of controller 400 may cause configuration instructions to be transmitted to one or more of devices 412, 414, and 416. The instructions may configure the forwarding tables of switches, routers, or other network devices as described herein. In some embodiments, the instructions are OpenFlow instructions. Control circuitry 402 of controller 400 may analyze network data, where the analysis may include measuring levels of network traffic and the destinations of the traffic and/or determining how to balance processing between forwarding tables. Controller 400 may further analyze subsequent network traffic after transmitting instructions in order to analyze the effects of the instructions. Controller 400 may perform machine learning in order to determine how to optimize the configuration of the group 410 of devices in a feedback mechanism.

Figure 5:
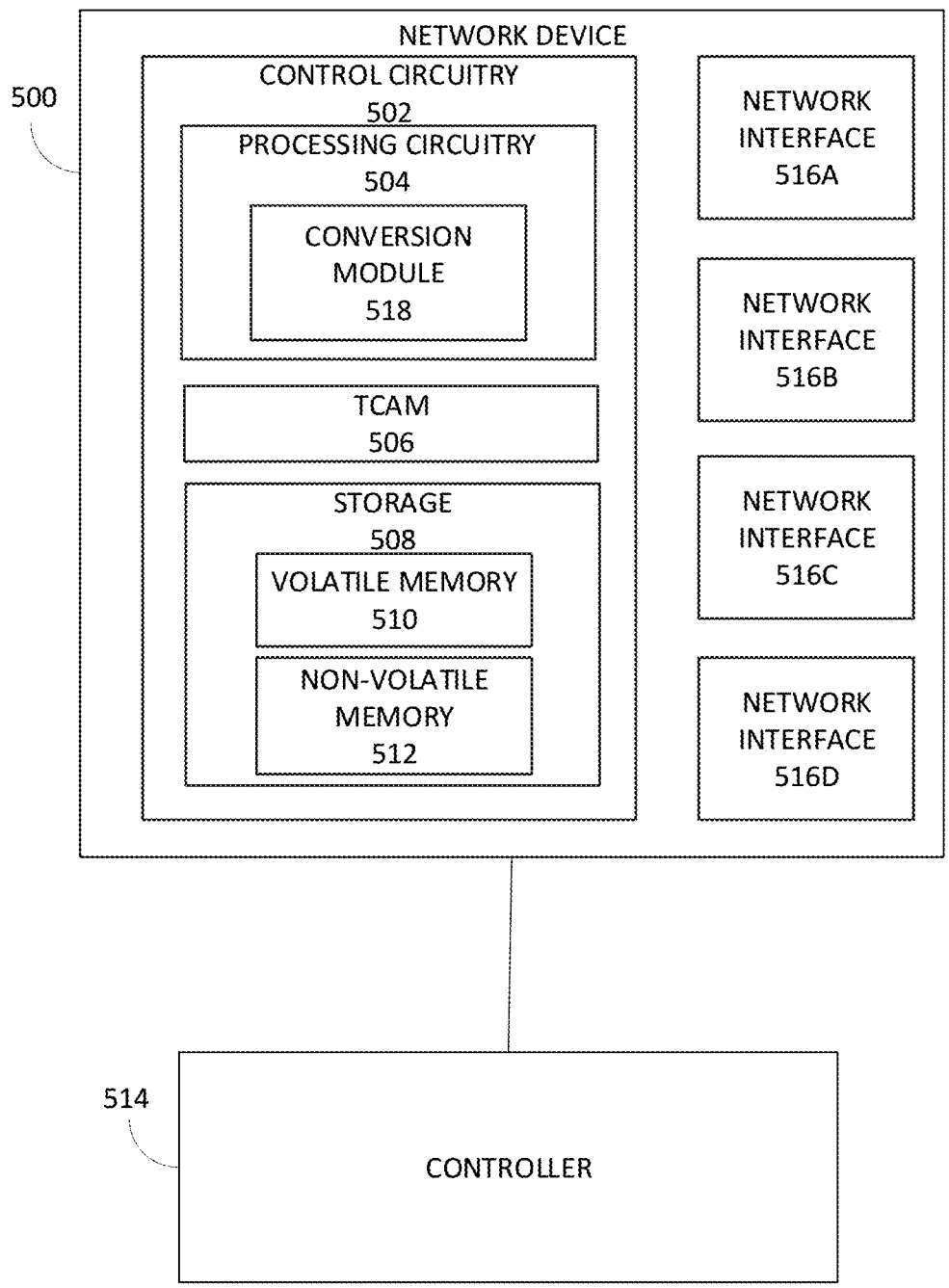
FIG. 5 shows a diagram of a network device, according to some embodiments.

FIG. 5 shows a diagram of an illustrative network device 500 for processing network traffic, in accordance with some embodiments of the disclosure. The network device 500 is an OpenFlow network device that facilitates the implementation of a multi-table OpenFlow pipeline on the device. However, the techniques of the present disclosure are not strictly limited to OpenFlow and thus may be used to implement any kind of multi-table software-defined networking (SDN) or packet processing pipeline in which flow table processing, with support for "goto table" or other similar actions, is desired or needed.

The network device 500 can receive, from a controller 514, flow entries for installation into flow tables of the network device 500, where the flow entries are structured in a manner that assumes the flow tables can be looked up by processing circuitry 504 of the network device. The flow tables are implemented using one or more TCAMs 506. In an embodiment, the flow entries may be structured in accordance with the requirements for multi-table OpenFlow pipeline processing. In some embodiments, flow tables may be implemented using other types of hardware lookup tables, such as hardware hash tables.

The control circuitry 502, of the network device 500, may be based on any suitable processing circuitry, such as processing circuitry 504. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor).

In some embodiments, the processing circuitry 504 is integrated with one or more on-chip TCAMs 506 including multiple TCAM banks, which can decrease processing latency and decrease footprint compared to non-chip-integrated TCAMs. Examples include Arista Networks 7050 Series network switches. Network interfaces 516A, 516B, 516C, and 516D may include input and output ports for receiving and transmitting network communications.

The processing circuitry 504 can comprise a conversion module 518. The network device 500 uses the conversion module 518 to convert OpenFlow protocol messages sent by the network controller 514 into a format that enables the processing circuitry 504 to process ingress network traffic according to the OpenFlow protocol message. In some embodiments, the conversion module 518 is able to directly translate an OpenFlow protocol message to a single flow entry or many flow entries. For example, an OpenFlow protocol message may include instructions for a single flow entry with particular match fields and a set of actions to be executed on matched packets. If the set of actions to be executed on matched packets of the single flow entry includes only one packet edit on a matched data packet, then the network device 500 translates and installs the single flow entry into the network device 500's flow tables. In some embodiments, conversion module 518 has to modify the flow entries translated from the OpenFlow protocol message. This modification process can include modifying the match fields and/or actions of the flow entries in a way that ensures ingress packets are matched according to the instructions indicated in the OpenFlow protocol message. For example, the network device 500 may be using an ASIC, which is capable of performing only a single packet edit of a data packet in a single flow. If the OpenFlow protocol message requires a flow entry's set of actions to include more than one data packet edit, the conversion module 518 will modify the flow entry as discussed herein.

In some embodiments, the network device 500 needs to recirculate a data packet in order to process ingress network traffic according to the OpenFlow protocol message. In one embodiment, the network device 500 configures an interface 516A as a recirculation interface, which causes all packets sent by network device 500 to that interface to be looped back (and thus "recirculated") as new ingress packets to be processed. For example, the conversion module 518 can modify the actions of a flow entry that has a "goto table" action to a "recirculate" action, thereby enabling the matched data packets to be recirculated. In practice, a matched data packet is sent to the recirculation interface which then recirculates the data packet. Upon being recirculated the data packet is matched again to flow entries of the appropriate destination flow table.

Storage 508 may be an electronic storage device that is part of control circuitry 502. As referred to herein, the phrase "electronic storage device" or "storage device" should be understood to mean any device for storing electronic data, computer software, instructions, and/or firmware, such as RAM, content-addressable memory (CAM), ternary content-addressable memory (TCAM), hard drives, optical drives, solid state devices, quantum storage devices, or any other suitable fixed or removable storage devices, and/or any combination of the same. The circuitry described herein may execute instructions included in software running on one or more general purpose or specialized processors. Multiple circuits may be provided to handle simultaneous processing functions. Further, other devices described herein may include the processing and storage components of device 500 and/or variations thereof.

The network device 500 of FIG. 5 can be implemented in the network of FIG. 3 as the switches (304 and 314) and/or router 310, but any other type of device suitable for implementing multi-table OpenFlow flows that have combinations of packet edits may be used. The architecture of the network device 500 shown in FIG. 5 is illustrative and not intended to limit embodiments of the present disclosure. For example, although FIG. 5 depicts a particular arrangement for components within the network device 500, other arrangements are possible (e.g., the functionality attributed to a particular component may be split into multiple components, components may be combined, etc.). Further, network device 500 may include other components/sub-components and/or implement other functions that are not specifically described.

Figure 6:
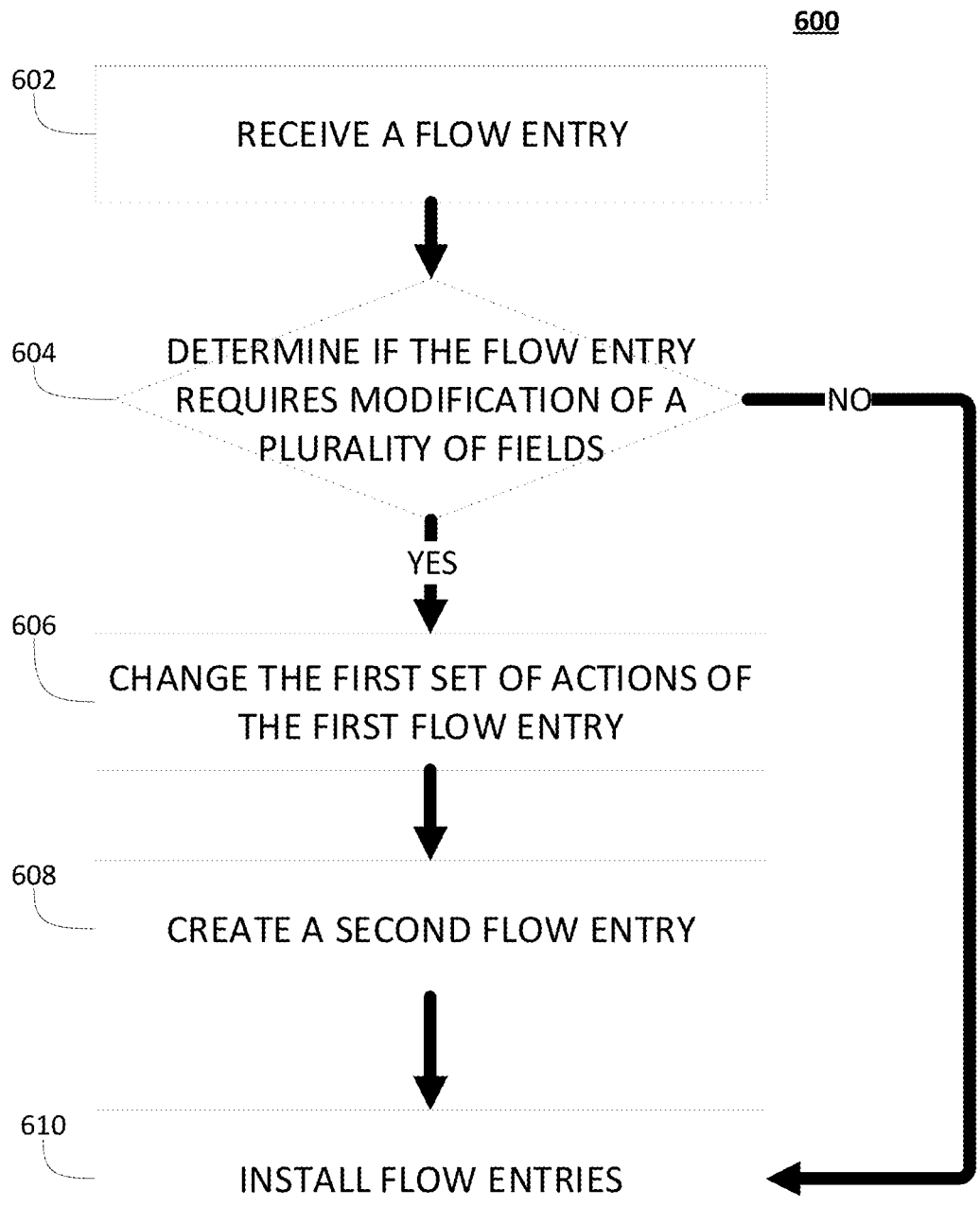
FIG. 6 is an illustrative flowchart of a process for processing flow entries that have combinations of data packet edits, in accordance with some embodiments of the disclosure.

FIG. 6 is an illustrative flowchart of a process 600 for processing flow entries that have combinations of data packet edits, in accordance with some embodiments of the disclosure. Process 600, and any of the following processes, may be executed by control circuitry 502 on a network device 500. Although the process 600 is illustrated as described as a sequence of steps, it is contemplated that various embodiments of process 600 may be performed in any order or combination and need not include all the illustrated steps.

At 602, the network device 500, by control circuitry 502, receives a flow entry. In some embodiments, the flow entry is received after the control circuitry 502 translates an OpenFlow protocol message received by a network controller. The flow entry includes a set of match fields specifying one or more criteria for matching data packets to the flow entry and a set of actions to be executed on matched packets. In some embodiments, the received flow entry may be an existing flow entry previously installed into the flow tables/TCAMs, either by control circuitry 502 or by some other mechanism. In such embodiments, the steps 604-610 can be executed by control circuitry 502 on each existing flow entry in the flow tables.

At 604, the network device 500, by control circuitry 502, determines if the flow entry requires modification of a plurality of fields. If the flow entry's set of actions include only one packet edit to be executed on a matched data packet, then the process continues to step 610, where the flow entry is installed into a flow table. If the flow entry's set of actions include more than one packet edit to be executed on a matched data packet, then the process continues to step 606.

At 606, the network device 500, by control circuitry 502, changes the first set of actions of the first flow entry. The control circuitry 502 changes the set of actions of the first flow entry to include generating and attaching a cookie to the data packet. The control circuitry 502 further changes the set of actions to edit only the first field of the two or more fields required by the original first flow entry. The control circuitry 502 further changes the "goto table" table action to a "recirculate" action. In some embodiments, the control circuitry creates a new first flow entry and deletes the original first flow entry.

At 608, the network device 500, by control circuitry 502, creates a second flow entry. The second flow entry's set of match fields at least matches on the cookie generated by the new first flow entry. In some embodiments, the second flow entry includes additional match criteria that match on data packets that do not have an attached cookie. The second flow entry's set of actions includes removing a cookie attached to a matched data packet if one exists. The second flow entry's set of actions further includes editing the second field of the two or more fields of the original first flow entry. The second flow entry's set of actions include the "goto table" action of the original first flow entry.

At 610, the network device 500, by control circuitry 502, installs the one or more flow entries in one or more flow tables. In some embodiments, when the network control circuitry 502 generates a first and second flow entry, the two flow entries are installed in a single flow table. In an embodiment, where flow entries are received by the network device 500 that do not include a plurality of packet edits, the flow entries may be installed in one or more flow tables. Rules for the installation of flow entries may come from the OpenFlow protocol message. In some embodiments, the rules for installation may be stored or generated by the control circuitry 502 of the network device 500.

Figure 7:
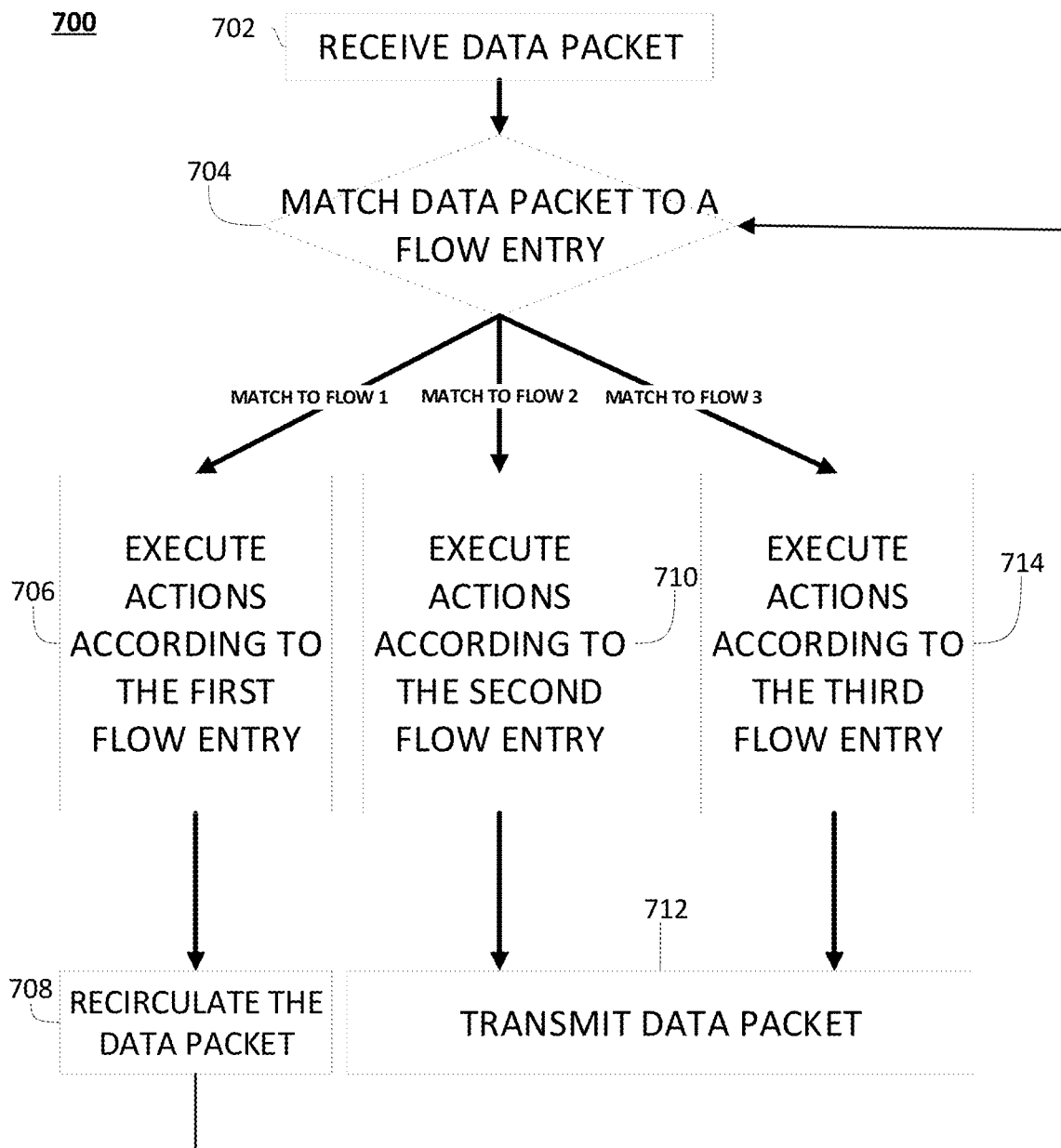
FIG. 7 is an illustrative flowchart of a process implementing multi-table OpenFlow flows that have combinations of data packet edits, in accordance with some embodiments of the disclosure.

FIG. 7 is an illustrative flowchart of a process for processing data packets using multi-table OpenFlow flows that have combinations of packet edits, in accordance with some embodiments of the disclosure. At 702, the network device 500, by control circuitry 502, receives a data packet from a network interface. In some embodiments, the network interface receives the data packet from a controller, router, network device, LAN device/destination or any other similar such devices.

At 704, the network device 500, by control circuitry 502, matches the data packet to flow entries. The control circuitry 502 matches the data packet against the flow entries of a first flow table using the set of match fields of the flow entries. If a match between a particular flow entry and a particular packet is found, the process continues to the corresponding process 700 step. For example, a data packet that matches on a first flow entry will continue to step 706, a data packet that matches on a second flow entry will continue to step 710, and a data packet that matches on a third flow entry will continue to step 714.

At 706, the network device 500, by control circuitry 502, executes a plurality of actions according to the first flow entry on which the data packet was matched. In an embodiment, the control circuitry 502 edits a first field of the data packet. For example, the control circuitry 502 may change the source and destination IP address of the data packet. The control circuitry 502 also generates and attaches a cookie to the data packet. The control circuitry 502 further executes a "recirculate" action corresponding to the first flow entry at 708.

At 708, the network device 500, by control circuitry 502, recirculates the data packet. The control circuitry 502 sends the data packet with the attached cookie and edited field to the recirculation interface. As mentioned, the control circuitry 502 configures an interface (e.g., 516A) as a recirculation interface, which causes each packet sent by control circuitry 502 to that interface to be looped back as a new ingress packet to the network device 500. Enabling the packet to be matched again against the flow entries of the appropriate destination flow table. This returns the data packet to step 704, where the control circuitry 502 matches the data packet against the flow entries of a first flow table using the set of match fields of the flow entries. The second flow entry has match fields matching on the cookie attached to the recirculated data packet. Accordingly, the second flow entry's actions are executed on that packet at step 710.

At 710, the network device 500, by control circuitry 502, executes a plurality of actions according to the second flow entry. In an embodiment, the control circuitry 502 edits a second field of the data packet. For example, the control circuitry 502 may change the source and destination Mac address of the data packet. The control circuitry 502 may also remove the cookie attached to the data packet.

At 712, the network device 500, by control circuitry 502, transmits the data packet. The destination of the data packet is in accordance with the "goto table" action of the flow entry to which the data packet is matched. Destinations may include another flow table, another device, the recirculation interface or any destination previously described herein. In some embodiments, a data packet may match a flow entry that does not include a "goto table" action. In said embodiment, control circuitry will drop the packet and conclude its processing.

At 714, the network device 500, by control circuitry 502, executes a plurality of actions according to the third flow entry on which the data packet was matched. The third flow entry demonstrates that the network device 500 can continue to install and use flow entries that do not require any type of recirculation. For example, when the third flow entry is received, the network device 500 determines that the third flow entry does not require a combination of packet edits. Accordingly, the third flow entry is installed into the flow table without any modifications. When a data packet is matched with the third flow entry, the control circuitry 502 executes the actions on the matched data packet as indicated by the originally received third flow entry. After the actions have been executed, the control circuitry 502 transmits the data packet at step 712 as described above.

The processes described above, including the processes of FIGS. 2, 6, and 7, are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method comprising:
   receiving, at a network device, a first flow entry to be installed into a first flow table, wherein the first flow entry includes a first set of match fields and a first set of actions;
   determining that the first set of actions includes modifications of a plurality of fields of a data packet;
   in response to determining that the first set of actions includes modifications of a plurality of fields of a data packet:

changing the first set of actions of the first flow entry to:
modify a first field of the plurality of fields of the data packet;
generate a cookie;
attach the cookie to the data packet; and
transmit the data packet for subsequent flow entry lookup; and
creating a second flow entry, the second flow entry including a second set of match fields and a second set of actions, the second set of match fields specifying one or more criteria for matching the data packet to the second flow entry, wherein one of the one or more criteria matches on the generated cookie of the data packet, the second set of actions specifying a plurality of actions to be taken on the data packet, wherein the second set of actions includes:
removing the cookie from the data packet; and
modifying a second field of the plurality of fields of the data packet; and
installing the first and second flow entries.

2. The method of claim 1, wherein the one or more criteria of the first set of match fields includes matching the first field and the second field of the matched data packet.

3. The method of claim 1, wherein the network device comprises application-specific integrated circuits.

4. The method of claim 1, wherein transmitting the data packet for subsequent flow entry lookup includes recirculating the data packet through the first flow table.

5. The method of claim 4, wherein the first and second flow entries are installed in the first flow table.

6. The method of claim 5, wherein the first flow table is implemented in a TCAM at the network device.

7. The method of claim 1, wherein transmitting the data packet for subsequent flow entry lookup includes passing the data packet to a second flow table.

8. The method of claim 7, wherein the second flow entry is installed in a second flow table.

9. An apparatus comprising:
control circuitry; and at least one memory including computer program code for one or more programs, the at least one memory and the computer program code configured to, with the control circuitry, cause the apparatus to perform at least the following:
receive, at a network device, a first flow entry to be installed into a first flow table, wherein the first flow entry includes a first set of match fields and a first set of actions;
determine that the first set of actions includes modifications of a plurality of fields of a data packet;
in response to determining that the first set of actions includes modifications of a plurality of fields of a data packet:
changing the first set of actions of the first flow entry to:
modify a first field of the plurality of fields of the data packet;
generate a cookie;
attach the cookie to the data packet; and
transmit the data packet for subsequent flow entry lookup; and
creating a second flow entry, the second flow entry including a second set of match fields and a second set of actions, the second set of match fields specifying one or more criteria for matching the data packet to the second flow entry, wherein one of the one or more criteria matches on the generated cookie of the data packet, the second set of actions specifying a plurality of actions to be taken on the data packet, wherein the second set of actions includes:
removing the cookie from the data packet; and
modifying a second field of the plurality of fields of the data packet; and
install the first and second flow entries.

10. The apparatus of claim 9, wherein the one or more criteria of the first flow entry includes matching the first field and the second field of the data packet.

11. The apparatus of claim 9, wherein the network device comprises application-specific integrated circuits.

12. The apparatus of claim 9, wherein the apparatus is further caused, when transmitting the data packet for subsequent flow entry lookup, to recirculate the data packet through the first flow table.

13. The apparatus of claim 12, wherein the first and second flow entries are installed in the first flow table.

14. The apparatus of claim 13, wherein the first flow table is implemented in a TCAM at the network device.

15. The apparatus of claim 9, wherein the apparatus is further caused, when transmitting the data packet for subsequent flow entry lookup, to pass the data packet to a second flow table.

16. The apparatus of claim 15, wherein the second flow entry is installed in a second flow table.

17. A non-transitory computer-readable medium having instructions encoded thereon that when executed by control circuitry causes the control circuitry to:
receive, at a network device, a first flow entry to be installed into a first flow table, wherein the first flow entry includes a first set of match fields and a first set of actions;
determine that the first set of actions includes modifications of a plurality of fields of a data packet;
in response to determining that the first set of actions includes modifications of a plurality of fields of a data packet:
changing the first set of actions of the first flow entry to:
modify a first field of the plurality of fields of the data packet;
generate a cookie;
attach the cookie to the data packet; and
transmit the data packet for subsequent flow entry lookup; and
creating a second flow entry, the second flow entry including a second set of match fields and a second set of actions, the second set of match fields specifying one or more criteria for matching the data packet to the second flow entry, wherein one of the one or more criteria matches on the generated cookie of the data packet, the second set of actions specifying a plurality of actions to be taken on the data packet, wherein the second set of actions includes:
removing the cookie from the data packet; and
modifying a second field of the plurality of fields of the data packet; and
install the first and second flow entries.

18. The non-transitory computer-readable medium of claim 17, wherein the one or more criteria of the first flow entry includes matching the first field and the second field of the data packet.

19. The non-transitory computer-readable medium of claim 17, wherein the network device comprises application-specific integrated circuits.

20. The non-transitory computer-readable medium of claim 17, wherein the control circuitry is further configured, when transmitting the data packet for subsequent flow entry lookup, to recirculate the data packet through the first flow table.

* * * * *